United States Patent [19]

Pilgrim et al.

[11] 4,000,234

[45] Dec. 28, 1976

[54] PROCESS FOR THE MANUFACTURE OF POLYOLEFIN FILM

[75] Inventors: James Frank Pilgrim, Elginburg; Robin Edwin Urquhart Routley, Pointe Claire; Wallace McKenzie Schwenger, Kingston, all of Canada

[73] Assignee: Du Pont of Canada Limited, Montreal, Canada

[22] Filed: Apr. 23, 1975

[21] Appl. No.: 570,722

[30] Foreign Application Priority Data

June 10, 1974 Canada .............................. 202345

[52] U.S. Cl. .............................. 264/95; 264/210 R; 264/237; 264/290 R; 425/326 R
[51] Int. Cl.[2] .......................................... B29C 17/02
[58] Field of Search .......... 264/40, 95, 210 R, 237, 264/290 R; 425/326 R

[56] References Cited

UNITED STATES PATENTS

| 2,461,975 | 2/1949 | Fuller | 425/326 R |
|---|---|---|---|
| 3,061,876 | 11/1962 | Lloyd et al. | 264/95 |
| 3,304,352 | 2/1967 | Gerow | 264/95 |
| 3,551,540 | 12/1970 | Pellicciari et al. | 264/290 |
| 3,577,488 | 5/1971 | Bigland | 264/95 |
| 3,888,609 | 6/1975 | Saint Eve et al. | 264/95 |

OTHER PUBLICATIONS

Clegg et al., The Effect of Extrusion Variables on the Prop. of Tubular Polythene Film– Part I & II – Plastics – vol. 26, Apr.–May 1961, pp. 119-120 & 107-110.

*Primary Examiner*—Jeffery R. Thurlow

[57] ABSTRACT

A process for the manufacture of polyolefin film, especially high density polyethylene film, is disclosed. In the process molten polyolefin is extruded through an annular die and the tubular molten polyolefin film so formed is withdrawn from the die, expanded, cooled and flattened. The process is controlled so that (a) the ratio of the diameter of the expanded tubular film to the diameter of the annular die is in the range 1.8:1 to 5:1, (b) the frost line formed as the polyolefin cools is at least four feet from the annular die, (c) the completion of the expansion of the tubular film is juxtaposed to, and prior to, the formation of the frost line. The ratio of diameters and the frost line are co-operatively adjusted with the rate at which the film is withdrawn from the annular die and the temperature at which the molten polymer is extruded through the die so that the Elmendorf tear in the machine direction is at least 15 gms./mil. In an embodiment the Elmendorf tear in the machine direction is at least 30 gms./mil. In another embodiment the ratio of the Elmendorf tear in the machine direction to that in the transverse direction is at least 0.3. The film is especially useful in the manufacture of bags, e.g., notion and millinery bags.

18 Claims, No Drawings

PROCESS FOR THE MANUFACTURE OF POLYOLEFIN FILM

The present invention relates to an improved process for the manufacture of polyolefin film. In particular, the invention relates to an improved process for the manufacture of polyethylene, especially so-called high density polyethylene, film.

Techniques for the manufacture of polyolefin film are known. One of these techniques is the so-called "conventional" process, an embodiment of which is described by E. D. Fuller in Canadian Patent No. 460,963 which issued on Nov. 8, 1949. In a conventional process molten polyolefin polymer is extruded through an annular die and the tubular molten polyolefin film formed is continuously withdrawn from the die, cooled, flattened and wound up on a roll. The molten polyolefin is cooled, usually by means of an air ring, soon after the polyolefin is extruded through the die. The tubular film may be expanded to the desired extent prior to the cooling or the polyolefin or, in particular, after cooling but prior to the flattening of the tubular film. The ability to expand the film will depend in part on the temperature of the film and in some cases, especially when the tubular film is expanded substantially so that an oriented film is obtained, the film may be reheated to facilitate expansion. Expansion of the tube is usually accomplished by means of a controlled pressure of gas inside the tubular film.

The known conventional processes may be unsatisfactory for the manufacture of polyolefin film especially for the manufacture of high density polyethylene film. In particular, such processes may be unsatisfactory for the manufacture of high density polyethylene film of balanced properties, for example, such film manufactured in a conventional process frequently is characterized by a very low tear strength in the machine direction, especially with respect to the tear strength in the transverse direction.

An improved process for the manufacture of polyolefin film, especially high density polyethylene film, of improved properties has now been found.

Accordingly, the present invention provides a process for the manufacture of polyolefin film comprising the steps of extruding molten polyolefin through an annular die, withdrawing the tubular molten polyolefin film so formed from the annular die, expanding said tubular film by maintaining a positive pressure of gas inside the tubular film and flattening the tubular film so formed, after the polyolefin has cooled, said process being controlled so that (a) the ratio of the diameter of the expanded tubular film to the diameter of the annular die is in the range 1.8:1 to 5:1, (b) the frost line formed as the polyolefin cools is maintained at least four feet from the annular die, (c) the completion of the expansion of the tubular film is juxtaposed to, and prior to, the formation of the frost line and (d) said ratio of diameters and the frost line being co-operatively adjusted with the rate at which the film is withdrawn from the annular die and the temperature at which the molten polymer is extruded through the annular die such that the Elmendorf tear of the film in the machine direction is at least 15 gms./mil.

The term "frost line" is explained in more detail hereinafter.

In an embodiment of the process of the present invention the ratio of the Elmendorf tear of the film in the machine direction to that in the transverse direction is greater than 0.3.

In another embodiment the Elmendorf tear in the machine direction is at least 30 gms./mil.

In yet another embodiment the tubular molten polyolefin film passes through an air ring that is juxtaposed to the annular die.

In a further embodiment the polyolefin is selected from the group consisting of ethylene homopolymers and of ethylene/butene-1 and ethylene/octene-1 copolymers, and blends thereof.

In still another embodiment the polyolefin is an ethylene homopolymer or copolymer of ethylene and butene-1, of density of at least 0.930 gm./cm.$^3$ and especially at least 0.945 gm./cm.$^3$.

In a still further embodiment the tubular molten polyolefin film passes through an air ring that is spaced apart from the annular die, the frost line being 0–3.0 feet and especially 0.5–2.0 feet further away from the annular die than the air ring.

A frost line occurs during the cooling of the molten polymer. As the polymer cools the temperature of the polymer falls below the melting point of the polymer and the polymer solidifies. This solidification of the polymer causes a change in the optical properties of the polymer, the polymer usually becoming more opaque. The change in optical properties of the polymer may be observed in the film and the position at which it occurs is known as the frost line. The frost line in the process of the present invention is at least four feet, and preferably 6–10 feet, from the annular die.

In the process of the present invention a molten polyolefin polymer is extruded through an annular die. The extruder and die must be capable of supplying a homogeneous melt of molten polymer to the lips of the die. The variation in thickness of the molten polymer extruded through the lips of the die is preferably low, so as both to aid in the control of the process and to facilitate the manufacture of a uniform product. The temperature of the molten polymer when it is extruded through the annular die, while being important in maintaining the frost line at the desired position, may depend in part on the melt flow and melt strength properties of the polymer. The term "melt flow properties" of the polymer is a general term used to describe the processability of a polymer at different temperatures. For example, because of differences in molecular weight, molecular weight distribution, degree of branching and the like, it may be necessary to process say polyethylenes of different types at different temperatures in order to achieve, for each particular polyethylene, a uniform flow of polymer from the extruder. The term "melt strength" relates to the strength of the polymer in a molten state especially with regard to the ability of the polymer to support its own weight without significant distortion of, in the process of the present invention, the tubular film of molten polymer. With regard to the frost line if the temperature at which the polymer is extruded is too low it may not be possible to form the frost line at the desired distance from the annular die, i.e., the frost line will be at less than the desired distance from the die. For ethylene homopolymers and copolymers of ethylene and butene-1 the minimum temperature of extrusion may be about 200°–210° C. depending on the particular apparatus used. If the polymer is extruded at too high a temperature it may be possible to maintain the frost line at the desired distance from the annular die by the use of, for example, air rings but the melt strength of such film may be too low to maintain the molten polymer in an acceptable tubular shape between the annular die and the frost line. Suitable extrusion temperatures are exemplified in the examples hereinafter.

Conventional processes for the manufacture of polyolefin film are normally operated with the film being extruded in a vertical direction. While not limited thereto the process of the present invention is generally described herein by reference to a process in which the polyolefin is extruded in an upward vertical direction. After extrusion of the molten polymer through the annular die, the tubular film is expanded to the desired extent, cooled or allowed to cool and flattened. The tubular film is flattened by passing the film through a set of nip rolls. These nip rolls may be driven rolls thereby providing means for withdrawing the tubular film from the annular die or the nip rolls may rotate freely with the means for withdrawing the film being provided thereafter.

A positive pressure of a gas, for example air or nitrogen, is maintained inside the tubular film, as is known in the operation of conventional film processes. The pressure of the gas is controlled so that the desired degree of expansion of the tubular film occurs. In the process of the present invention the degree of expansion, as measured by the ratio of the diameter of the expanded tubing to that of the annular die, is in the range 1.8:1 to 5:1 and preferably in the range 2:1 to 4:1. As the degree of expansion is relatively low and as the thickness of the tubing decreases as the distance from the annular die increases, the tubing expands at a position away from the die. The completion of the expansion of the tubing is adjusted so that it is juxtaposed to, and prior to, the formation of the frost line. The position at which expansion occurs has been found to be important with respect to the properties of the film produced. Expansion of the tubing significantly below the frost line results in a poorer balance of film properties, the properties of the film produced by the process of the present invention being discussed hereinafter.

The position of the completion of the expansion of the tubing, with respect to the frost line, may be dependent on the film speed. For example, at a film speed of 40 feet per minute the expansion should be completed less than about one inch from the frost line. In a preferred embodiment the expansion is completed less than about 0.5 inches, especially less than 0.25, inches from the frost line.

In the process of the present invention the temperature of the polymer as it is extruded through the annular die, the rate at which the tubular film is withdrawn from the annular die and the degree of expansion of the film are co-operatively adjusted so as to maintain the frost line at the desired distance from the annular die and so that the expansion of the tubing occurs at the desired position. As the melt strength of a polymer decreases with increasing temperature the temperature at which the polymer is extruded through the annular die is preferably maintained in the low end of the range of operable temperatures. In a preferred embodiment the tubular film is passed through an air ring located juxtaposed to the annular die. The air passed through the air ring may be used, in particular, to control the height of the frost line.

In a preferred embodiment of the process of the present invention the tubing is passed through an air ring located 0.5 to 2.0 feet below the desired position of the frost line on the tubing. This so-called "elevated air ring" may be used in addition to, or instead of, the air ring juxtaposed to the die. In this embodiment the process operated with at least a small flow of air through the air ring as such a flow aids in stabilizing the position of the frost line and the location of the tubular film.

In another embodiment the tubular film is shielded, especially between the die and the frost line, from stray draughts, currents of air and the like in the vicinity of the process as this also aids in stabilizing the location of the tubular film and the position of the frost line.

Using the process of the present invention polyolefin film having an Elmendorf tear measured in the machine direction of at least 15 gms./mil, especially at least 30 gms./mil, and a ratio of Elmendorf tear in the machine direction to that in the transverse direction of greater than 0.3 may be produced. Elmendorf tear is measured by the method of ASTM D-1922. In a preferred embodiment the ratio of Elmendorf tear in the machine direction to that in the transverse direction is in the range 0.7:1 to 1:0.7.

The film produced by the process of the present invention may be used in the manufacture of small bags, pouches and the like, for example, notion and millinery bags. Film having low, e.g., 10 gms./mil, values of Elmendorf tear in the machine direction is prone to splitting along the machine direction of the film when such film is made into, for example, notion and millinery bags. The film of the present invention is improved in this respect. Film in which the Elemdorf tear in the machine direction is significantly higher than that in the transverse direction may be of benefit for some end uses. Such film may also be made by the process of the present invention.

The preferred polyolefins of the present invention are ethylene homopolymers and ethylene/butene-1 and ethylene/ octene-1 copolymers, and blends thereof. In particular, ethylene homopolymers and ethylene/butene-1 copolymers of density of at least 0.930 gm./cm.$^3$ and in particular at least 0.945 gm./cm.$^3$, are preferred. All the polyolefins of the present invention are capable of being extruded as film. Preferred polyolefins have a melt flow index of less than 1.0 gms./10 min. and in particular less than 0.5 gm./10 min. melt flow index being measured by the method of ASTM D-1238 (condition E). Minor amounts, e.g., up to 10–15% by weight, of another polymer, for example, ethylene/vinyl acetate copolymers, ethylene/propylene copolymers and ethylene/propylene/diene polymers, may be added to the polyolefins used in the process of the present invention.

The process of the invention is illustrated by the following examples.

In all the runs in the examples the completion of the expansion of the tubular film was juxtaposed to the frost line. The examples illustrate the effect of frost line height, the temperature of extrusion of the polymer, the ratio of the diameter of the tubular film to that of the annular die, the rate at which the film is withdrawn from the die and the effect of air rings.

EXAMPLE I

In an upward vertical conventional film extrusion process a polymer was extruded through an annular die of a diameter of 4 inches and having a die gap of approximately 27 mils. The tubular molten polymer film was withdrawn continuously from the annular die through an air ring, the outlet of which was approximately one inch from the die. The tubular molten polymer film was allowed to cool and then it was flattened and wound up.

Additional experimental details and the results obtained are given in Table I.

EXAMPLE II

The process of Example I was repeated except that the air ring was raised so that it was 0.5 feet below the frost line.

Additional experimental details and the results obtained are given in Table II.

EXAMPLE III

To illustrate the effect of process variables on the properties of the resultant film the process of Example I was repeated using the ethylene polymer identified as Polymer A in Table I.

Further details of the process variables and the results obtained are given in Table III.

EXAMPLE IV

To illustrate the effect of process variables with the raised air ring the air ring was mounted 4.5 feet above the die and the air flow through the air ring was controlled so that the frost line was 6–9 inches above the air ring. The polyolefin used was Polymer A of Table I.

Further details of the process variables and the results obtained are given in Table IV.

TABLE I

| Run No. | Polymer* | Polymer Temperature at Die (° C.) | Air Flow in Air Ring (scfm) | Height of Frost Line (inches) | Blow-Up**** Ratio | Film Gauge (mil) | Film Speed (fpm) | Elmendorf Tear** (gm/mil) Machine Direction | Transverse Direction | Dart Strength*** (gm/mil) |
|---|---|---|---|---|---|---|---|---|---|---|
| 1 | A | 293 | 200 | 6 | 2.9 | 1.0 | 34 | 13 | 290 | 210 |
| 2 | A | 268 | 150 | 28 | 4.0 | 1.1 | 20 | 32 | 1280 | 395 |
| 3 | A | 260 | 200 | 10 | 4.0 | 1.1 | 20 | 17 | 1125 | 285 |
| 4 | A | 288 | 60 | 84 | 2.0 | 1.0 | 44 | 64 | 204 | 215 |
| 5 | A | 288 | 0 | 180 | 2.0 | 2.0 | 22 | 154 | 40 | 80 |
| 6 | B | 216 | 100 | 28 | 4.0 | 1.0 | 22 | 15 | 59 | 60 |
| 7 | B | 221 | 50 | 48 | 2.5 | 2.0 | 15 | 17 | 46 | 85 |
| 8 | B | 221 | 200 | 7 | 2.5 | 1.3 | 23 | 12 | 54 | NA |
| 9 | C | 199 | 100 | 22 | 4.3 | 1.0 | 20 | 20 | 193 | 155 |
| 10 | C | 221 | 50 | 60 | 3.2 | 1.5 | 20 | 23 | 35 | 95 |
| 11 | B | 204 | 50 | 72 | 2.5 | 0.75 | 80 | 37 | 103 | NA |

*A = ethylene homopolymer of density 0.955, melt index 0.04.
B = ethylene homopolymer of density 0.960, melt index 0.75.
C = ethylene/butene-1 copolymer of density 0.950, melt index 0.40.
**Elmendorf Tear measured by the method of ASTM D-1922.
***Dart Strength measured by the method of ASTM D-1709.
****Ratio of diameter of expanded film to diameter of annular die.
NA = not available.

TABLE II

| Run No. | Polymer | Polymer Temperature at Die (° C.) | Air Flow in Air Ring (scfm) | Height of Frost Line (inches) | Blow-Up Ratio | Film Gauge (mil) | Film Speed (fpm) | Elmendorf Tear (gm/mil) Machine Direction | Transverse Direction | Dart Strength (gm/mil) |
|---|---|---|---|---|---|---|---|---|---|---|
| 12 | C | 213 | 150 | 108 | 3.2 | 0.8 | 40 | 50 | 50 | NA |
| 13 | A | 266 | 150 | 130 | 3.0 | 0.6 | 54 | 420 | 10 | NA |
| 14 | A | 262 | 150 | 130 | 3.2 | 0.65 | 49 | 602 | 24 | NA |
| 15 | A | 250 | 150 | 130 | 4.1 | 0.3 | 73 | 408 | 13 | NA |
| 16 | A | 288 | 20 | 156 | 3.4 | 2.0 | 50 | 464 | 27 | 65 |

TABLE III

| Run No. | Polymer Temperature at Die (° C.) | Air Flow in Air Ring (scfm) | Height of Frost Line (inches) | Blow-Up Ratio | Film Gauge (mil) | Film Speed (fpm) | Elmendorf Tear (gm/mil) Machine Direction | Transverse Direction |
|---|---|---|---|---|---|---|---|---|
| 17 | 288 | ca 60 | 69 | 1.9 | ca 1.0 | 125 | 27 | 152 |
| 18 | 288 | ca 50 | 90 | 1.9 | ca 1.0 | 125 | 39 | 123 |
| 19 | 288 | ca 30 | 102 | 1.9 | ca 1.0 | 125 | 81 | 49 |
| 20 | 288 | ca 30 | 108 | 1.9 | ca 1.0 | 125 | 15 | 688 |
| 21 | 293 | ca 60 | 69 | 2.0 | ca 1.0 | 100 | 44 | 70 |
| 22 | 293 | ca 50 | 87 | 2.0 | ca 1.0 | 100 | 46 | 101 |
| 23 | 293 | ca 30 | 102 | 2.0 | ca 1.0 | 100 | 103 | 52 |
| 24 | 293 | ca 70 | 48 | 2.3 | ca 1.0 | 89 | 54 | 97 |
| 25 | 293 | ca 50 | 72 | 2.3 | ca 1.0 | 89 | 91 | 48 |
| 26 | 293 | ca 30 | 108 | 2.3 | ca 1.0 | 89 | 76 | 53 |
| 27 | 293 | ca 20 | 132 | 2.3 | ca 1.0 | 89 | 21 | 279 |
| 28 | 260 | ca 30 | 96 | 1.8 | ca 1.0 | 59 | 29 | 192 |
| 29 | 260 | ca 30 | 96 | 2.2 | ca 1.0 | 49 | 58 | 87 |
| 30 | 293 | ca 30 | 96 | 1.8 | ca 1.0 | 59 | 35 | 318 |
| 31 | 293 | ca 30 | 96 | 2.2 | ca 1.0 | 49 | 79 | 111 |
| 32 | 271 | ca 30 | 96 | 1.8 | ca 1.0 | 100 | 28 | 147 |
| 33 | 274 | ca 30 | 96 | 2.2 | ca 1.0 | 82 | 70 | 117 |
| 34 | 274 | ca 30 | 96 | 2.5 | ca 1.0 | 66 | 95 | 55 |
| 35 | 301 | ca 30 | 96 | 1.8 | ca 1.0 | 100 | 19 | 486 |
| 36 | 307 | ca 30 | 96 | 2.2 | ca 1.0 | 82 | 34 | 198 |
| 37 | 301 | ca 30 | 96 | 2.5 | ca 1.0 | 66 | 164 | 56 |

TABLE IV

| Run No. | Polymer Temperature at Die (° C.) | Air Flow in Air Ring (scfm) | Height of Frost Line (inches) | Blow-Up Ratio | Film Gauge (mil) | Film Speed (fpm) | Elmendorf Tear (gm/mil) Machine Direction | Transverse Direction |
|---|---|---|---|---|---|---|---|---|
| 38 | 254 | ca 150 | ca 62 | 2.0 | ca 1.0 | 44 | 40 | 318 |
| 39 | 254 | ca 130 | ca 62 | 3.0 | ca 1.0 | 34 | 48 | 206 |
| 40 | 254 | ca 120 | ca 62 | 4.0 | ca 1.0 | 22 | 67 | 67 |
| 41 | 254 | ca 120 | ca 62 | 4.5 | ca 1.0 | 20 | 145 | 35 |
| 42 | 254 | ca 150 | ca 62 | 2.0 | ca 1.0 | 65 | 57 | 94 |
| 43 | 254 | ca 130 | ca 62 | 3.0 | ca 1.0 | 55 | 98 | 48 |
| 44 | 254 | ca 120 | ca 62 | 4.0 | ca 1.0 | 42 | 122 | 35 |
| 45 | 254 | ca 120 | ca 62 | 4.5 | ca 1.0 | 36 | 161 | 44 |
| 46 | 254 | ca 150 | ca 62 | 2.0 | ca 1.0 | 87 | 21 | 156 |
| 47 | 254 | ca 130 | ca 62 | 3.0 | ca 1.0 | 64 | 85 | 59 |
| 48 | 254 | ca 120 | ca 62 | 4.0 | ca 1.0 | 55 | 197 | 27 |
| 49 | 254 | ca 120 | ca 62 | 4.5 | ca 1.0 | 48 | 278 | 22 |

The embodiments of the invention in which an exclusive property or privilege is claimed are defined as follows:

1. A process for the manufacture of polyolefin film comprising the steps of extruding molten polyolefin through an annular die, withdrawing the tubular molten polyolefin film so formed from the annular die, expanding said tubular film by maintaining a positive pressure of gas inside the tubular film and flattening the tubular film so formed after the polyolefin has cooled, said process including:
   a. expanding the tubular film whereby the ratio of the diameter of the expanded tubular film to the diameter of the annular die is in the range 1.8:1 to 5:1,
   b. maintaining the frost line formed as the polyolefin cools at least four feet from the annular die,
   c. completing the expansion of the tubular film juxtaposed to, and prior to, the formation of the frost line and
   d. co-operatively adjusting said ratio of diameters and the frost line with the rate at which the film is withdrawn from the annular die and the temperature at which the molten polymer is extruded through the annular die such that the Elmendorf tear of the film in the machine direction is at least 15 gms./mil and the ratio of the Elmendorf tear of the film in the machine direction to that in the transverse direction is greater than 0.3.

2. The process of claim 1 in which the polyolefin is selected from the group consisting of ethylene homopolymers and ethylene/butene-1 and ethylene/octene-1 copolymers, and blends thereof, said polyolefin being of a density of at least 0.930 gm./cm.$^3$.

3. The process of claim 1 in which the ratio of diameters is in the range 2:1 to 4:1.

4. The process of claim 3 in which the frost line is 6 to 10 feet from the annular die.

5. The process of claim 4 in which the completion of the expansion of the tubular film is less than about 0.5 inches from the frost line.

6. The process of claim 2 in which the Elmendorf tear of the film in the machine direction is at least 30 gms./mil.

7. The process of claim 6 in which the frost line is 6 to 10 feet from the annular die.

8. The process of claim 6 in which the completion of the expansion of the tubular film is less than about 0.5 inches from the frost line.

9. The process of claim 6 in which the tubular molten polyolefin film passes through an air ring that is juxtaposed to the annular die, air passed therethrough being used in the control of said process.

10. The process claim 6 in which the tubular molten polyolefin film passes through an air ring that is located 0 to 3 feet closer to the annular die that the frost line, air passed therethrough being used in the control of said process.

11. The process of claim 6 in which the tubular molten polyolefin film passes through an air ring that is located 0.5 to 2.0 feet closer to the annular die than the frost line, air passed therethrough being used in the control of said process.

12. The process of claim 6 in which the ratio of the Elmendorf tear in the machine direction to that in the transverse directions is in the range 0.7:1 to 1:0.7.

13. The process of claim 6 in which the thickness of the film so produced is in the range 0.3 to 2.0 mil.

14. The process of claim 6 in which the density of the polyolefin is at least 0.945 gm./cm.$^3$.

15. The process of claim 6 in which the melt flow index of the polyolefin is less than 1.0.

16. The process of claim 6 in which the melt flow index of the polyolefin is less than 0.5.

17. The process of claim 2 in which the polyolefin contains up to 15% by weight of a polymer selected from the group consisting of ethylene/vinyl acetate copolymers, ethylene/ propylene copoylmers and ethylene/propylene/diene polymers.

18. The process of claim 6 in which the completion of the expansion of the tubular film is less than 0.25 inches from the frost line.

* * * * *